(12) United States Patent  (10) Patent No.: US 9,276,428 B2
Chuang et al.  (45) Date of Patent: Mar. 1, 2016

(54) SYSTEM POWER INTEGRATED CIRCUIT AND ARCHITECTURE, MANAGEMENT CIRCUIT, POWER SUPPLY ARRANGEMENT, AND PORTABLE APPARATUS

(75) Inventors: Hsun-Hsin Chuang, Taoyuan County (TW); Chien-Shen Tsai, Taoyuan County (TW); Yueh-Hsiang Chen, Taoyuan County (TW)

(73) Assignee: HTC CORPORATION, Taoyuan County (TW)

( * ) Notice: Subject to any disclaimer, the term of this patent is extended or adjusted under 35 U.S.C. 154(b) by 829 days.

(21) Appl. No.: 13/331,609

(22) Filed: Dec. 20, 2011

(65) Prior Publication Data

US 2013/0009470 A1  Jan. 10, 2013

Related U.S. Application Data

(60) Provisional application No. 61/504,710, filed on Jul. 6, 2011.

(51) Int. Cl.
*H02J 7/00* (2006.01)
*H02M 1/00* (2007.01)

(52) U.S. Cl.
CPC .......... *H02J 7/0065* (2013.01); *H02M 2001/007* (2013.01); *Y10T 307/406* (2015.04)

(58) Field of Classification Search
CPC . G06F 1/263; H02J 7/0065; H02M 2001/007; H02M 2001/0067; G05F 1/00; G05F 1/46
USPC ................... 455/572, 127.1; 307/75
See application file for complete search history.

(56) References Cited

U.S. PATENT DOCUMENTS

| | | | | |
|---|---|---|---|---|
| 6,163,706 | A * | 12/2000 | Rozenblit et al. | 455/522 |
| 6,374,127 | B1 * | 4/2002 | Park | 455/572 |
| 6,798,177 | B1 * | 9/2004 | Liu et al. | 323/222 |

(Continued)

FOREIGN PATENT DOCUMENTS

| | | | |
|---|---|---|---|
| CN | 101425747 A | | 5/2009 |
| GB | 2402279 A | * | 12/2004 |

(Continued)

OTHER PUBLICATIONS

Taiwanese Office Action dated on Aug. 7, 2014.

(Continued)

*Primary Examiner* — Jared Fureman
*Assistant Examiner* — Brett Squires
(74) *Attorney, Agent, or Firm* — Rabin & Berdo, P.C.

(57) ABSTRACT

According to one embodiment, a management circuit for a portable device includes an input terminal, a first step-up converter, a first step-down converter, and a second step-down converter. The input terminal is coupled to receive a supply voltage from a power supply. The first step-up converter, coupled to the input terminal, selectively converts the supply voltage to a boosted voltage. The first step-down converter, coupled to the first step-up converter, selectively provides a first output power voltage to a first radio frequency (RF) module. The second step-down converter, coupled to the first step-up converter, selectively provides a second output power voltage to a second radio frequency (RF) module. The first step-up converter performs the conversion of the supply voltage when the supply voltage is under a threshold voltage.

21 Claims, 8 Drawing Sheets

(56) References Cited

U.S. PATENT DOCUMENTS

| | | |
|---|---|---|
| 7,576,529 B2 * | 8/2009 | Ishino ............................. 323/284 |
| 2005/0029872 A1 | 2/2005 | Ehrman et al. |
| 2005/0213354 A1 | 9/2005 | Pai |
| 2006/0262579 A1 | 11/2006 | Chou |
| 2007/0210775 A1 * | 9/2007 | Bothra et al. .................. 323/283 |
| 2008/0054867 A1 | 3/2008 | Soude et al. |
| 2008/0100143 A1 * | 5/2008 | Lipcsei ............................ 307/80 |
| 2008/0278136 A1 * | 11/2008 | Murtojarvi .................... 323/299 |
| 2009/0278506 A1 | 11/2009 | Winger et al. |
| 2010/0148580 A1 * | 6/2010 | Taniuchi ........................ 307/29 |
| 2012/0299564 A1 * | 11/2012 | Howes et al. ................. 323/281 |

FOREIGN PATENT DOCUMENTS

| | | | |
|---|---|---|---|
| KR | 2008073029 A | * | 8/2008 |
| TW | 200830088 A | | 7/2008 |
| TW | 200937161 A | | 9/2009 |
| TW | 201006285 A | | 2/2010 |

OTHER PUBLICATIONS

Chinese Office Action dated Apr. 7, 2015.

* cited by examiner

| Category | Battery State | SYSEN | OUTSU1 | OUTSU2 Control | ADJBST1 | PAEN1 | PAEN2 | SU1 | SD1 | SD2 | SU2 HVLDO Booster (no load) | IQ (uA) | Remark |
|---|---|---|---|---|---|---|---|---|---|---|---|---|---|
| Off | X | L | X | X | X | X | X | SU1 = 0 | SD1 = 0 | SD2 = 0 | SU2 = 0 | 0 | SYSEN = L, system is disable. |
| SU ON, SD OFF | HV | H | 0x00 | 0x00 | X | L | L | SU1 = VBAT | SD1 = 0 | SD2 = 0 | SU2 = VBAT | | SU1/SU2 = bypass mode. SD1/SD2 = OFF. |
| SU ON, SD OFF | LV | H | 0x00 | 0x00 | H | L | L | SU1 = V_outsu1 | SD1 = 0 | SD2 = 0 | SU2 = V_outsu2 | | SU1/SU2 = boost mode. SD1/SD2 = OFF |
| SU ON, SD OFF | LV | H | 0x00 | 0x00 | L | L | L | SU1 = V_outsu1 | SD1 = 0 | SD2 = 0 | SU2 = V_outsu2 | | SU1/SU2 = boost mode. SD1/SD2 = OFF |
| SU1 OFF, SU2 ON SD1/SD2 OFF | HV | H | 0x10 | 0x00 | X | L | L | SU1 = 0 | SD1 = 0 | SD2 = 0 | SU2 = VBAT | | SU1 = OFF, SU2 = bypass mode, SD1/SD2 =OFF |
| SU1 OFF, SU2 ON SD1/SD2 OFF | LV | H | 0x10 | 0x00 | X | L | L | SU1 = 0 | SD1 = 0 | SD2 = 0 | SU2 = V_outsu2 | | SU1 = OFF, SU2 = boost mode, SD1/SD2 =OFF |
| SU1 ON, SU2 ON SD1 ON, SD2 OFF (2G Mode) | HV | H | 0x00 | 0x00 | L | H | L | SU1 = VBAT | SD1= V_outsd1 (V_insd1 > V_outsd1) | SD2 = 0 | SU2 = VBAT | | 2G mode, SU1 = bypass mode, SD1 = V_outsd1 (Buck mode) |
| SU1 ON, SU2 ON SD1 ON, SD2 OFF (2G Mode) | HV | H | 0x00 | 0x00 | L | H | L | SU1 = VBAT | SD1= V_insd1 (V_insd1 < V_outsd1) | SD2 = 0 | SU2 = VBAT | | 2G mode, SU1 = bypass mode. SD1 = V_insd1 (Bypass mode) |
| SU1 ON, SU2 ON SD1 ON, SD2 OFF (2G Mode) | LV | H | 0x00 | 0x00 | L | H | L | SU1 = 5.5V | SD1 = 0 | SD2 = 0 | SU2 = V_outsu2 | | 2G mode, SU1 = boost mode. SD1 =V_outsu1 |
| SU1 ON, SU2 ON SD1 ON, SD2 OFF (3G Mode) | HV | H | 0x00 | 0x00 | L | H | L | SU1 = VBAT | SD1 = 0.4V ~ Vin (By APT) | SD2 = 0 | SU2 = VBAT | | 3G mode, SU1 = bypass mode, SD1 = APT mode |
| SU1 ON, SU2 ON SD1 ON, SD2 OFF (3G Mode) | LV | H | 0x00 | 0x00 | H | H | L | SU1 = V_outsu1 | SD1 = 0.4V ~ Vin (By APT) | SD2 = 0 | SU2 = V_outsu2 | | 3G mode, SU1 = boost mode, SD1 = APT mode |
| SU1 ON, SU2 ON SD1 ON, SD2 ON (CDMA + LTE) | HV | H | 0x00 | 0x00 | H | H | H | SU1 = VBAT | SD1 = 0.4V ~ Vin (By APT) | SD2 = 0.4V ~ Vin (APT) | SU2 = VBAT | | CDMA + LTE mode, SU1 = bypass mode, SD1/SD2 = APT mode |
| SU1 ON, SU2 ON SD1 ON, SD2 ON (CDMA + LTE) | LV | H | 0x00 | 0x00 | H | H | H | SU1 = V_outsu1 | SD1 = 0.4V ~ Vin (By APT) | SD2 = 0.4V ~ Vin (APT) | SU2 = V_outsu2 | | CDMA + LTE mode, SU1 = boost mode, SD1/SD2 = APT mode |
| SU1 ON, SU2 ON SD1 ON, SD2 ON (2G Mode + LTE) | HV | H | 0x00 | 0x00 | L | H | H | SU1 = VBAT | SD1= V_outsd1 (V_insd1 > V_outsd1) | SD2 = 0.4V ~ Vin (APT) | SU2 = VBAT | | 2G + LTE mode, SU1 = bypass mode, SD1 = V_outsd1=buck mode, and SD2 = APT mode |
| SU1 ON, SU2 ON SD1 ON, SD2 ON (2G Mode + LTE) | HV | H | 0x00 | 0x00 | L | H | H | SU1 = VBAT | SD1= V_insd1 (V_insd1 < V_outsd1) | SD2 = 0.4V ~ Vin (APT) | SU2 = VBAT | | 2G + LTE mode, SU1 = bypass mode, SD1 = V_insd1=bypass mode, and SD2 = APT mode |
| SU1 ON, SU2 ON SD1 ON, SD2 ON (2G Mode + LTE) | LV | H | 0x00 | 0x00 | L | H | H | SU1 = 5.5V | SD1=V_outsd1 | SD2 = 0.4V ~ Vin (APT) | SU2 = V_outsu2 | | 2G + LTE mode, SU1 = boost mode, SD1 = V_outsd1, and SD2 = APT |

FIG. 7

SYSTEM POWER INTEGRATED CIRCUIT AND ARCHITECTURE, MANAGEMENT CIRCUIT, POWER SUPPLY ARRANGEMENT, AND PORTABLE APPARATUS

This application claims the benefit of U.S. provisional application Ser. No. 61/504,710, filed Jul. 6, 2011, the subject matter of which is incorporated herein by reference.

BACKGROUND

1. Technical Field

The disclosure relates in general to power integrated circuit, and more particularly to a system power integrated circuit and system power architecture for portable devices, management circuit, power supply arrangement, and portable apparatus.

2. Description of the Related Art

Mobile devices, such as a smart phone or a tablet computer, now become indispensable to many people. The mobile devices are very versatility but the use of their functionality may lead to a large amount of power consumption and energy capacity of the energy source, e.g. battery, for powering the devices is very limited. In particular, the mobile devices include telecommunication modules such as 2G, 3G, or 4G, that are very energy consuming and sensitive to the power level of the energy source. As such, power control and management in the mobile devices become critical.

SUMMARY

The disclosure is directed to a system power integrated circuit and system power architecture for portable devices, a method for controlling the same and a method for providing power signals.

According to an embodiment the present disclosure, a system power architecture for use in an electronic device is provided. The system power architecture includes a power integrated circuit (IC) and a power management integrated circuit (PMIC) coupled to the power IC.

According to an embodiment the present disclosure, a power integrated circuit is provided. The power integrated circuit includes a number of power converters, wherein each power converter offers a bypass mode and can be controlled.

According to an embodiment, a power integrated circuit is provided. The power integrated circuit includes a number of power converters and control logic, wherein each power converter offers a bypass mode.

According to an embodiment, an electronic device with a system power architecture is provided. According to an embodiment, a method for control a system power unit is provided. According to an embodiment, a method for providing power signals is provided.

According to one embodiment, a management circuit for a portable device includes an input terminal, a first step-up converter, a first step-down converter, and a second step-down converter. The input terminal is coupled to receive a supply voltage from a power supply. The first step-up converter, coupled to the input terminal, selectively converts the supply voltage to a boosted voltage. The first step-down converter, coupled to the first step-up converter, selectively provides a first output power voltage to a first radio frequency (RF) module. The second step-down converter, coupled to the first step-up converter, selectively provides a second output power voltage to a second radio frequency (RF) module. The first step-up converter performs the conversion of the supply voltage when the supply voltage is under a threshold voltage.

According to one embodiment, a power supply arrangement for a portable device includes a first input terminal, a first step-up converter, a second step-up converter, a radio frequency unit, and a functional unit. The first input terminal is coupled to receive a supply voltage of an energy source. The first step-up converter, coupled to the first input terminal, selectively converts the supply voltage to a first boosted voltage. The second step-up converter, coupled to the first input terminal, selectively converts the supply voltage to a second boosted voltage. The radio frequency unit (such as a communication module for 2G, 3G, or 4G and so on) has a first operation voltage, coupled to the first step-up converter. The functional unit (such as system logic, one or more system components, modules, or sub-units, or any circuitry for performing one or more functions), having a second operation voltage, is coupled to the second step-up converter. The first step-up converter performs the conversion of the supply voltage when the supply voltage is lower than the first operation voltage, and the second step-up converter performs the conversion of the supply voltage when the supply voltage is lower than the second operation voltage.

According to another embodiment, a power supply arrangement includes: a power integrated circuit, a radio frequency unit, a functional unit, and a power management circuit. The power integrated circuit, with a first input terminal coupled to an energy source, a first output terminal, and a second output terminal, selectively converts a supply voltage of the energy source to a first boosted voltage and selectively converts the supply voltage to a second boosted voltage. The radio frequency unit with a first operation voltage, coupled to the first output terminal, receives the first boosted voltage. The functional unit includes a high voltage electric load with a second operation voltage; and a low voltage electric load with a third operation voltage. The power management circuit includes a second input terminal coupled to the energy source; a third input terminal coupled to the second output terminal of the power integrated circuit to receive the second boosted voltage; a third output terminal coupled to the high voltage electric load; and a fourth output terminal coupled to the low voltage electric load. The power integrated circuit performs the conversion of the supply voltage when the supply voltage is lower than the second operation voltage, and the power management circuit provide a low output voltage from the energy source to the low voltage electric load as the third operation voltage through the fourth output terminal.

According to an embodiment, a portable apparatus includes a housing, a power integrated circuit, a radio frequency unit, and a functional unit. The power integrated circuit, retained in the housing, includes a first input terminal, a first boost converter, and a second boost converter. The first input terminal is coupled to an energy source providing a supply voltage. The first boost converter, with a first terminal coupled to the first input terminal and a second terminal, selectively converts the supply voltage to a first boosted voltage through the second terminal of the first boost converter. The second boost converter, with a first terminal coupled to the first input terminal and a second terminal, selectively converts the supply voltage to a second boosted voltage through the second terminal of the second boost converter. The radio frequency unit, with a first operation voltage, is retained in the housing and coupled to the first boost converter. The functional unit, with a second operation voltage, is retained in the housing and coupled to the second boost converter. The first boost converter performs the conversion of the supply voltage when the supply voltage is lower than the first operation voltage, and the second boost converter performs the conversion of the supply voltage when the supply voltage is lower than the second operation voltage.

According to another embodiment, a portable apparatus includes a housing, a power integrated circuit, a radio frequency unit, and a functional unit. The power integrated circuit, retained in the housing, includes a first input terminal, a first boost converter, and a second boost converter. The first input terminal is coupled to an energy source providing a supply voltage. The first boost converter, with a first terminal coupled to the first input terminal and a second terminal, selectively boosts the supply voltage to an output voltage through the second terminal of the first boost converter. The second boost converter, with a first terminal coupled to the first input terminal and a second terminal, selectively boosts the supply voltage to a high output voltage through the second terminal of the second boost converter. The radio frequency unit, with a first operation voltage, is retained in the housing and coupled to the second terminal of the first boost converter. The functional unit, retained in the housing and coupled to the second terminal of the second boost converter, includes a high voltage electric load with a second operation voltage and a low voltage electric load with a third operation voltage. The first boost converter performs the conversion of the supply voltage when the supply voltage is lower than the first operation voltage, and the second boost converter performs the conversion of the supply voltage when the supply voltage is lower than the second operation voltage.

According to still another embodiment, a portable apparatus includes a housing, a power integrated circuit, a radio frequency unit, a functional unit, and a power management circuit. The power integrated circuit is retained in the housing, with a first input terminal coupled to an energy source, a first output terminal, and a second output terminal. The power integrated circuit selectively converts a supply voltage of the energy source to a first boosted voltage and for selectively converting the supply voltage to a second boosted voltage. The radio frequency unit, with a first operation voltage, is retained in the housing and coupled to the first output terminal to receive the first boosted voltage. The functional unit includes: a high voltage electric load with a second operation voltage, and a low voltage electric load with a third operation voltage. The power management circuit, retained in the housing, includes: a second input terminal coupled to the energy source; a third input terminal coupled to the second output terminal of the power integrated circuit to receive the second boosted voltage; a third output terminal coupled to the high voltage electric load; and a fourth output terminal coupled to the low voltage electric load. The power integrated circuit performs the conversion of the supply voltage when the supply voltage is lower than the second operation voltage, and the power management circuit provide a low output voltage from the energy source to the low voltage electric load as the third operation voltage through the fourth output terminal.

According to one embodiment, a system power circuit unit includes a power circuit, in response to a plurality of control signals including a first control signal, providing a plurality of output power signals including a first output power signal and a second output power signal. The power circuit includes a plurality of power converters. For example, the power circuit includes a first step-up converter, a first step-down converter, and a second step-down converter. The first step-up converter, having an input terminal and an output terminal, is coupled to an input power signal via the input terminal of the first step-up converter. The first step-down converter has an input terminal and an output terminal, and the input terminal of the first step-down converter is coupled to the output terminal of the first step-up converter and the output terminal of the first step-down converter for providing the first output power signal. The second step-down converter has an input terminal and an output terminal, and the input terminal of the second step-down converter is coupled to the output terminal of the first step-up converter, wherein the input terminals of the first and the second step-down converters are to be coupled to the energy storage circuit. Each of the power converters of the power circuit, in response to the control signals, selectively operates in one of a plurality of modes including a normal mode and a bypass mode, wherein the normal mode enables the power converter correspondingly stepping up or stepping down an input signal of the power converter when the input signal thereof does not satisfy an associated threshold thereof; and the bypass mode enables the power converter to output the input signal thereof directly as its output signal when the input signal satisfies the associated threshold.

According to an embodiment of a portable apparatus in general is provided associated with the system power circuit unit as exemplified above. In such embodiment, a portable electronic apparatus includes a device housing (such as a housing for a smart phone, a tablet computer, an electronic book or any data or media processing device), a display, a processing unit, providing a plurality of control signals for power control, a radio frequency unit, and a system power circuit unit. The apparatus can optionally include a holder configured to retain an energy source, such as a battery or any further power source package. The system power circuit unit as exemplified above, may include: a power circuit and a power management circuit, coupled to the power circuit. The power circuit, in response to the control signals and an input power signal, provides a plurality of output power signals for powering the radio frequency unit, the power circuit comprising a plurality of power converters, and provides power signals for powering all or some or a specific one of components or units of the portable electronic apparatus, such as the display and the processing unit in response to the input power signal from the energy source.

According to an embodiment, a method for powering in a portable electronic device, includes the following steps. A system power circuit unit is provided, wherein the system power circuit unit comprises a power circuit, in response to a plurality of control signals and an input power signal, providing a plurality of output power signals for powering a radio frequency unit of the portable electronic device, the power circuit comprising a plurality of power converters. In response to a first control signal indicating a first communication mode for the portable electronic device, each of the power converters is selectively enabled in one of a plurality of modes including a normal mode and a bypass mode so as to power a first radio frequency module of the radio frequency unit. In response to the first control signal indicating a second communication mode for the portable electronic device, each of the power converters is selectively enabled in one of the modes so as to power a second radio frequency module of the radio frequency unit. The normal mode enables the power converter correspondingly stepping up or stepping down an input signal of the power converter when the input signal thereof does not satisfy an associated threshold thereof; and the bypass mode enables the power converter to output the input signal thereof directly as its output signal when the input signal satisfies the associated threshold.

The above and other aspects of the disclosure will become better understood with regard to the following detailed description of the non-limiting embodiment(s). The following description is made with reference to the accompanying drawings.

BRIEF DESCRIPTION OF THE DRAWINGS

FIG. 7 illustrates a state table for a power IC according to an embodiment.

DETAILED DESCRIPTION

Figure 1:
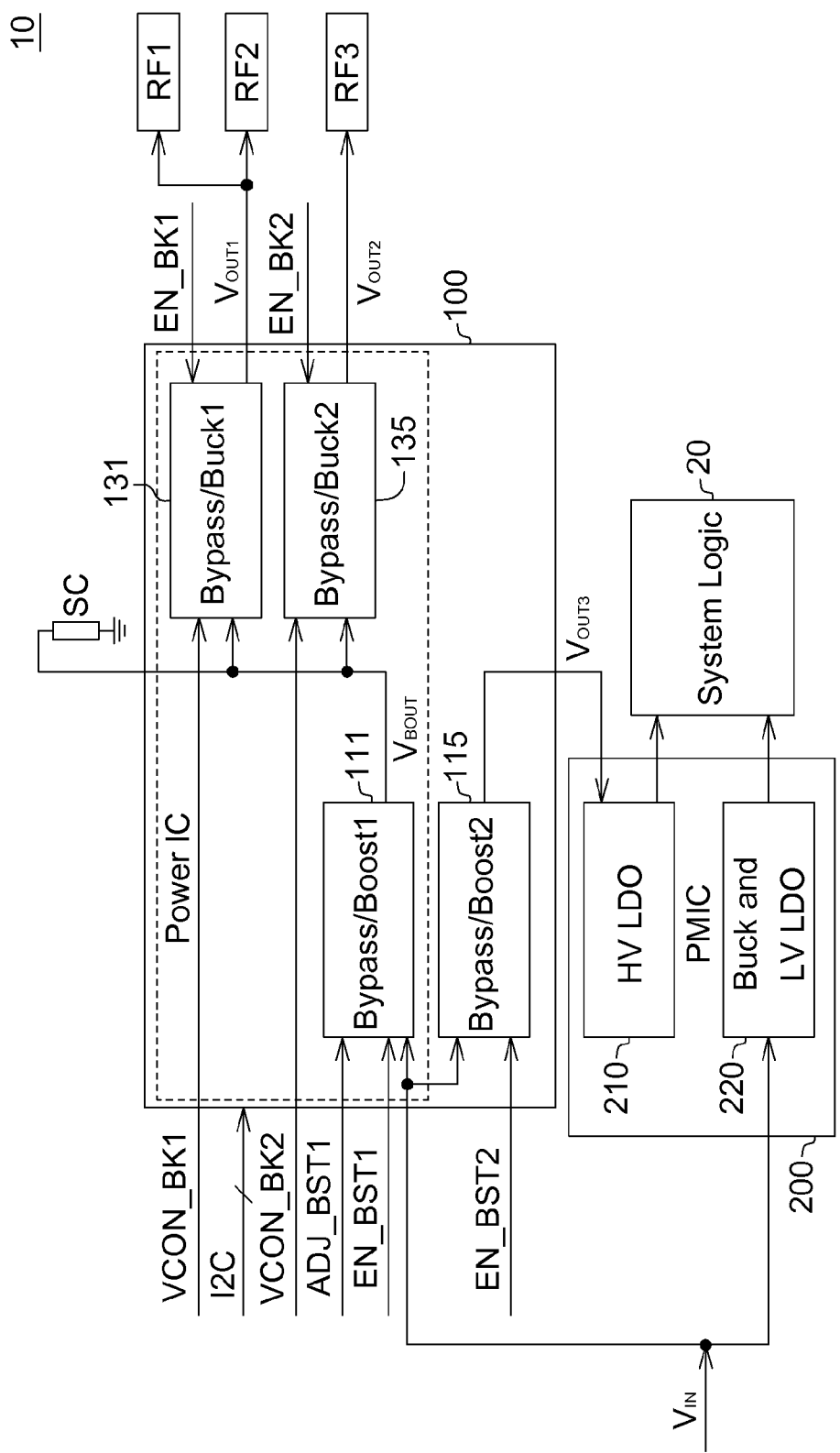
FIG. 1 illustrates a system power architecture for use in an electronic device according to an embodiment in a block diagram.

FIG. 1 illustrates a system power architecture for use in an electronic device according to an embodiment in a block diagram form. The electronic device 10, for example, a mobile device such as a smart phone, a tablet computer, a notebook computer, a multimedia player device, and so on. The electronic device 10 may be powered by a battery or an external energy source, thus obtaining an input power signal $V_{IN}$, e.g., a DC signal, and includes a number of electric loads, for example, one or more radio frequency (RF) modules for communication, denoted by RF1, RF2, and RF3, and other system devices, such as system logic 20.

According to the embodiment, the electronic device 10 employs a system power architecture including a power integrated circuit (IC) 100 and a power management integrated circuit (PMIC) 200, coupled to the power IC 100. In response to the $V_{IN}$, the power IC 100 provides appropriate output power signals, e.g., denoted by $V_{OUT1}$, $V_{OUT2}$, and $V_{OUT3}$, for some of the electric loads and the PMIC 200. Receiving the output power signal, e.g., $V_{OUT3}$, from the power IC 100, the PMIC 200 provides other output power signals for the other electronic loads. In particular, the power IC can be controlled by one or more control signals, e.g., outputted from the system logic 20 or other control source or device, so as to adjust the output power signals with appropriate and sufficient signal levels for driving the electric loads. For example, the adjustment to the level of the output power signals may be initiated in view of the status of the energy source, e.g., the energy source in a state of lower or higher output signal level, or in view of the operating mode of the electronic device 10, or in view of power resource control.

In one embodiment, the electronic device 10 is exemplified by a mobile device, such as a smart phone or a tablet computer, with a number of communication systems, e.g., 2G, 3G and LTE, etc., to provide mobile communication functionality. Following this embodiment, the electronic device 10 includes RF modules, such as RF1 or RF2 or RF3, with components for 2G and 3G mobile communications. For example, RF1 can be exemplified by a 2G RF module, e.g., including a GSM or a 2G CDMA RF power amplifier. RF2 can be exemplified by a 3G RF module, e.g., including a UMTS (such as WCDMA, TD-SCDMA) or CDMA200 RF power amplifier. RF3 can be exemplified by a LTE or next generation communication system.

In the above embodiment, the power IC 100 includes a number of power converters, e.g., step-up and/or step-down converters, to provide appropriate output power signals for driving the RF modules. As exemplified in FIG. 1, the power IC 100 may include a first power converter 111, a second power converter 131 for driving the RF modules RF1 and RF2, a third power converter 135 for driving the RF module RF3, and a fourth power converter 115 for providing an output power signal $V_{OUT3}$ for the PMIC 200. Each of the converters selectively operates as a power converter when the input signal does not satisfy an associated threshold and operates in a bypass mode which enables the converter to output its input signal directly as its output signal when the input signal satisfies the associated threshold. For example, the first power converter 111 can be a boost converter, denoted by bypass/boost1 in FIG. 1, while the second power converter 131 and third power converter 135 can be buck converters, indicated by bypass/buck1 and bypass/buck2, respectively. For bypass/boost1 with a threshold voltage of 3.3 V, when $V_{IN} \geq 3.3$ V, bypass/boost1 operates in the bypass mode. When $V_{IN} < 3.3$ V, bypass/boost1 operates as a boost converter to provide an output voltage of a specific level, e.g., 3.1 V, 3.3 V, 3.5 V, or 3.6 V.

In particular, the threshold voltage and/or current limit of at least the first power converter 111 can be adjustable and controllable by way of a control signal. For example, the first power converter 111 can be set with a different threshold value, in response to a control signal, e.g., via a communication interface such as I2C, SPI, or so on. In other examples, the threshold voltage and/or current limit of other boost or buck with bypass mode can also be controlled in the similar manner. In this way, the power IC 100 can be controlled flexibly or dynamically for providing appropriate output power signals for the electric loads in view of different needs of the mobile device 10.

In the embodiment of the electronic device 10 as a mobile device, 2G and 3G modes would not be active at the same time. When the electronic device 10 is in a 2G mode, the RF1 requires a larger driving current of 2.5 A, for example. In this case, the threshold (Vth) of bypass/boost1 is set to a higher value, e.g., 3.5V or 3.6V. In a 3G mode, the RF2 requires a lower power consumption and a lower driving current of about 560 to 800 mA, Vth is set to a lower value, e.g., 3.3V. Bypass/boost1 provides an output power signal $V_{BOUT}$, and bypass/buck1 and bypass/buck2 are coupled to the signal $V_{BOUT}$. In addition, the output terminal of bypass/boost1 and input terminals of bypass/buck1 and bypass/buck2 are coupled to an energy storage circuit SC, e.g., a capacitor, for energy storage. The energy storage circuit SC is charged by the signal $V_{BOUT}$ and operates in cooperation with bypass/buck1 and bypass/buck2 in order for bypass/buck1 and bypass/buck2 to provide the output power signals $V_{OUT1}$ and $V_{OUT2}$ with appropriate signal levels. For example, in the 2G mode, the output power signal $V_{OUT1}$ is required for a larger current as indicated above. Bypass/buck1 with a larger current limit (e.g., 2.5 A or 2 A) steps down the signal $V_{BOUT}$ from bypass/boost1 with a lower current limit (e.g., 1.5 A) to an adjustable output power signal $V_{OUT1}$. The energy storage circuit SC enables bypass/buck1 to provide a larger current. In this way, the requirement for a larger current for driving the RF module RF1, e.g., including a GSM RF power amplifier, can be fulfilled. Further, the energy storage circuit SC, e.g., a capacitor, is required to have different capacitance for the requirements for the mobile device which support different communication modes. For example, a mobile device supporting a 2G GSM mode may employ the energy storage circuit SC having a capacitance of about 330 uF, and about 10 to 20 uF for supporting a CDMA or WCDMA RF Power Amplifier.

In an embodiment, the first power converter 111 can be controllable in different operation mode by way of a control signal denoted by ADJ_BST1. ADJ_BST1 can determine if the first power converter 111 has to providing a larger current for driving the RF module 1 mentioned above, e.g., GSM power amplifier. For example, when Vin is lower than a threshold (Vth), ADJ_BST1 can be at a first voltage (e.g., a low level). Correspondingly, bypass/boost1 111 can operate as a boost converter for outputting a specific output voltage, e.g. 5.5V to provide enough driving capability to bypass/buck1 131 for RF1 module which includes GSM Power Amplifier. In contrast, when Vin is higher than Vth, converter 111 can operate in a bypass mode. Correspondingly, ADJ_BST1 is at a second voltage (e.g., a high level), bypass/boost1 operates as a boost converter or in the bypass mode selectively according to whether the input power signal satisfies the threshold voltage. In an embodiment, a register (not shown) can be defined in Power IC 100 to reverse the polarity of ADJBST1 by controlling signal, e.g. I2C, to fulfill different RF module requirements for indicating a large current drain request.

In further embodiments, the electronic device 10 can initiate the change of operation mode and/or threshold voltage of the first power converter 111 (or the second power converter 131 and so on) in view of the status of the energy source, such as the energy source in a state of lower or normal output signal level, or in view of the operating mode of the electronic device 10. The output power signals, such as $V_{OUT1}$, $V_{OUT2}$ as well as $V_{BOUT}$, can be adjustable accordingly for the requirements of the electric loads. The following Table provides examples in view of the voltage level of the input power signal $V_{IN}$, such as the status of an output voltage of a battery unit (such as, high or low battery state), and the communication mode (such as 2G, 3G) in which the electronic device 10 operates.

TABLE (* ADJ_BST1 can be polarity reserved by I2C control, depending on RF Module design specification)

| $V_{IN}$ (state) | ADJ_BST1 | $V_{BOUT}$ | Comm. mode | $V_{OUT1}$ |
|---|---|---|---|---|
| Low battery | Low | 5.5 V | 2G | 3.4 V |
| Low battery | High | Threshold voltage for 3G | 3G/4G | Depending on the required power |
| High battery | Low | Bypass Mode ~$V_{IN}$ | 2G | Bypass Mode ~$V_{BOUT}$ |
| High battery | High | Bypass Mode ~$V_{IN}$ | 3G/4G | Depending on the required power |

The above table illustrates the relationship between control signal and output voltage under different RF communication modes. Control signal ADJ_BST1 can be polarity reserved by I2C control, depending on RF Module design specification.

In 2G mode, when $V_{IN}$ indicates a low battery state, ADJ_BST1 can be set to a low voltage. Correspondingly, ADJ_BST1 can indicate that bypass/boost1 serves as a boost converter to step up $V_{IN}$ to 5.5V ($V_{BOUT}$) while Bypass/buck1 is set to provide the output power signal $V_{OUT1}$ with a fixed voltage of 3.4V. On the other hand, when $V_{IN}$ satisfies a threshold, ADJ_BST1 can be low, and converter 111 operates in a bypass mode. If $V_{BOUT}$ is higher than $V_{OUT1}$, converter 131 operates in a buck mode. If $V_{BOUT} < V_{OUT1}$, converter 131 operates in the bypass mode.

In another case that the electronic device 10 operates in 3G/4G mode, when $V_{IN}$ indicates a low battery state, ADJ_BST1 is set to a high voltage indicating that bypass/boost1 serves as a boost converter to step up $V_{IN}$ to 3.3V ($V_{BOUT}$) or enters the bypass mode to output $V_{IN}$ as $V_{BOUT}$, depending on whether $V_{IN}$ satisfies a threshold voltage for 3G. In addition, the output power signal $V_{OUT1}$ of bypass/buck1 depends on the required power for the RF module RF2. In this way, the output voltage of bypass/buck1 can be set dynamically according to the power control of the 3G communication standard, such as power control scheme. For other cases where $V_{IN}$ indicates a high battery state in the Table, one can readily derive the operations following the above discussion.

In other embodiments, the electronic device 10 can further support 4G communication mode, such LTE or LTE-Advanced. Following these embodiments, the third power converter 135 illustrated in FIG. 1 can be used for driving the RF module RF3, e.g. including an RF power amplifier for 4G. In these embodiments, 3G and 4G modes may be active at the same time and the power IC 100 can be further controlled so that the bypass/buck1 and bypass/buck2 can operate for providing the output power signals $V_{OUT1}$ and $V_{OUT2}$ with appropriate signal levels for driving RF modules RF2 and RF3, either individually or both at the same time. In an embodiment, the bypass/boost1 and bypass/boost2 can be configured with different input current limits, e.g. 2.7 A and 1.5 A respectively by I2C programming.

In one embodiment, the first power converter 111 and the second power converter 131 can be included in an IC package for driving the RF modules RF1 and RF2. In another embodiment, the first power converter 111, the second power converter 131, the third power converter 135 can be included in an IC package for driving the RF modules RF1, RF2, and RF3.

In other embodiment, for system power management, at least one or more power converters of the power IC 100 according to the above embodiments can be set to a power saving mode, such as on/off or standby or suspend mode, individually by way of a control signal, e.g., denoted by EN_BST1 for bypass/boost1. For example, when EN_BST1 is asserted (i.e., enabled), bypass/boost1 is turned on. In other example, when EN_BK2 is negated (i.e., disabled), bypass/buck2 is turned off. In a situation where only one RF module is used, e.g. 3G is only used, the RF module RF3 could be turned off, and bypass/buck2, e.g. converter 135 could be turned off by way of EN_BK2 to reduce power consumption. Likewise, for bypass/buck1 and bypass/boost2 can be turned on or off by using EN_BK1 and EN_BST2.

In other embodiments, the power levels for the output power signals of bypass/buck1 and bypass/buck2 can be set by way of analog input signals, e.g., denoted by VCON_BK1 and VCON_BK2, for APT (Auto Power Tracking) or ET (Envelop Tracking). For example, the output power signals can set depending on the duty cycle % of the corresponding VCON_BK1 and VCON_BK2 that are PWM signals. In other embodiments, bypass/buck1 and bypass/buck2 can be configured to be controlled by way of digital signals, such as the same way as bypass/boost1.

In the above embodiments, the fourth power converter 115 can be also included in the power IC 100. The fourth power converter 115, e.g., denoted by bypass/boost2, receives the input power signal $V_{IN}$ and provides an output power signal $V_{OUT3}$ for the PMIC 200. The PMIC 200 includes a number of power circuits, such as a first power circuit 210 and a second power circuit 220. The first power circuit 210, such as high-voltage low dropout regulators (HV LDO), is used for providing power signals for high-voltage electric loads, such as LCD panel with backlight, camera module, USB module, flash memory, or EMMC memory. The second power circuit 220, such as low-voltage low dropout regulators (LV LDO) and bucks, is used for providing power signals for low-voltage electric loads, such as CPU, SDRAM, DDR memory, control logic, I/O, and other devices. The components or IC devices of the electronic device 10 can be regarded as high-voltage and low-voltage electric loads according to the design and requirements of the components or IC devices, and the examples of high-voltage and low-voltage electric loads indicated above are for the sake of explanation only and not limited thereto.

Figure 2:
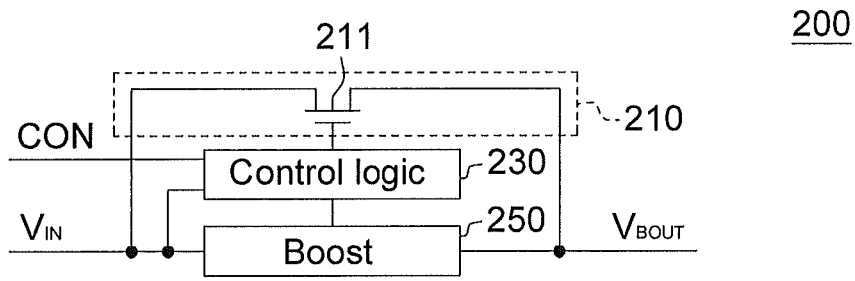
FIG. 2 illustrates an embodiment of a power circuit with bypass.

FIG. 2 illustrates an embodiment of a power circuit with a bypass mode. The power circuit 200, such as a boost converter with a bypass mode, includes a bypass circuit 210, control logic 230, and a boost 250. The bypass circuit 210, for example, includes at least a switch element 211, such as a transistor switch, controlled by the control logic 230. The control logic 230 includes logic circuit or other components and can be controlled for operations as exemplified above for the first power converter 111 or in the examples of the Table. The control signal CON for controlling the power converter 200 can be regarded as ADJ_BST1 for setting the power converter 200 in different operation mode. There are control signals, e.g., I2C control signal, (not shown) to communicate with control logic 230 for setting the threshold voltage and/or current limit, as discussed above. When the power circuit 200 operates as a boost converter or in the bypass mode, the control logic 230 detects the input power signal $V_{IN}$ and determines whether $V_{IN}$ satisfies the threshold voltage. In one embodiment, the power converters of the power IC 100 can be implemented by using the power converter 200.

Figure 3:
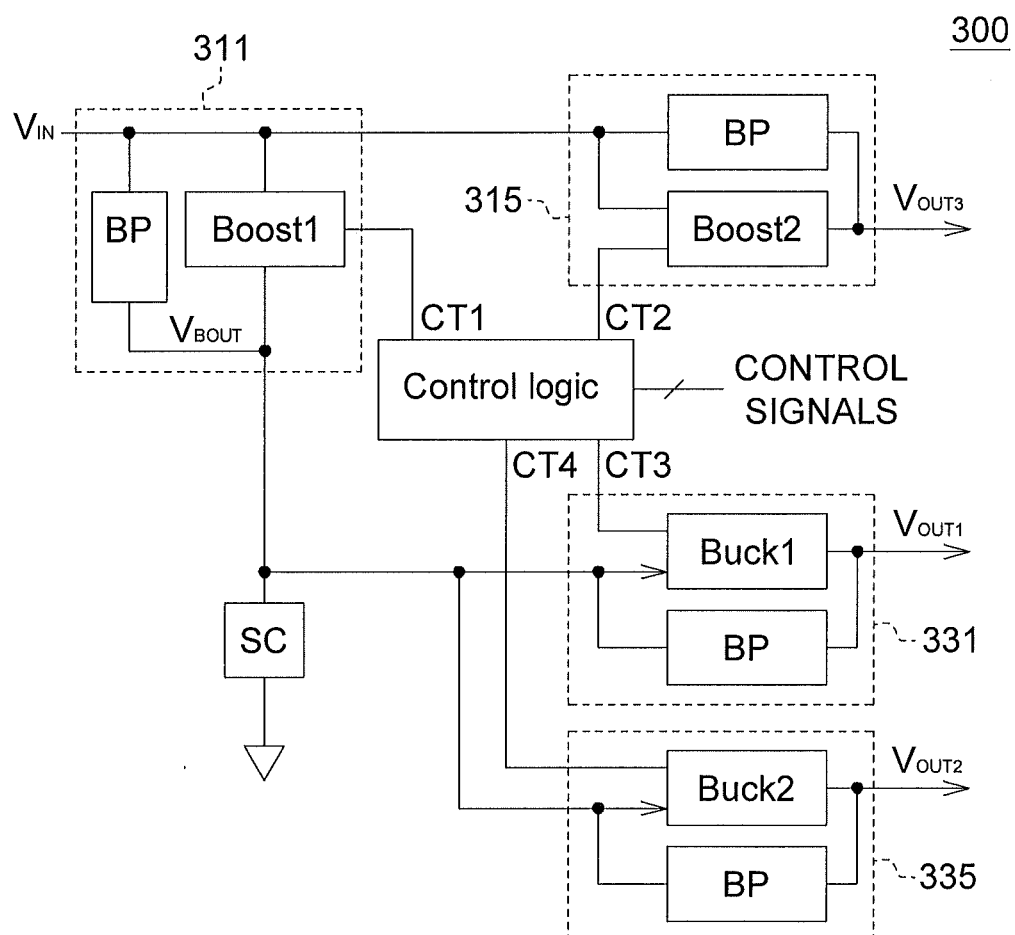
FIG. 3 shows another embodiment of a power circuit.

FIG. 3 shows another embodiment of a power circuit. The power circuit 300 can be configured to replace the power IC 100 as shown in FIG. 1 for the above embodiments. The power circuit 300 includes a first power converter 311, a second power converter 331, a third power converter 335, and a fourth power converter 315 for providing an output power signal $V_{OUT3}$ for the PMIC 200. The first power converter 311 receives an input power signal $V_{IN}$ and provides an output power signal $V_{BOUT}$. The second power converter 331 and third power converter 335 provides the outputs power signals $V_{OUT1}$ and $V_{OUT2}$. In addition, the power circuit 300 includes control logic, coupled to the first to fourth power converters, for controlling the first to fourth power converters by way of internal control signals CT1 to CT4. In addition, the control logic of the power converter 300 receives external control signals, such as ADJ_BST1, EN_BST1, EN_BST2, EN_BK1, EN_BK2, or I2C or any other form of signals indicating the setting of threshold voltages and/or current limit, tuning on and off of the power converter, or setting the operation mode of the power converter. In addition, each of the power converters includes a bypass circuit (BP). For example, the first power converter 311 includes a bypass circuit BP and a boost circuit (Boost1), and the second power converter 331 includes a bypass circuit BP and a buck circuit (Buck1).

In one embodiment, the first power converter 311 and the second power converter 331 and the control logic can be included in an IC package. In another embodiment, the first power converter 311, the second power converter 331, the third power converter 335 can be included in an IC package. In other embodiments, the fourth power converter 315 can be further included.

Figure 4:
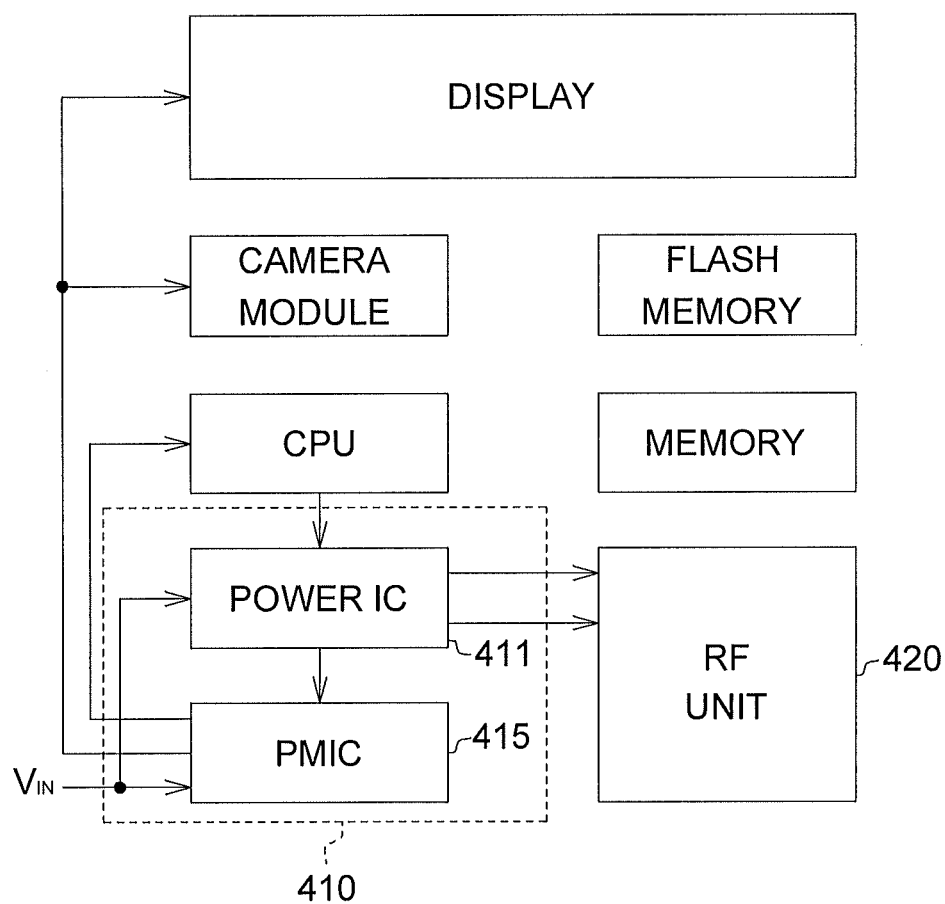
FIG. 4 shows an electronic device with a system power architecture according to an embodiment.

FIG. 4 shows an embodiment of an electronic device with a system power architecture. The electronic device 400, for example, a mobile device, such as a smart phone, a tablet computer, a navigation device, a gaming device, or a digital personal assistant and so on, includes a system power unit 410 and a RF unit 420. The system power unit 410 employs the system power architecture, as exemplified by the embodiments according to FIGS. 1 to 3, and includes a power IC 411 and a PMIC 415. The power IC 411 and the PMIC 415 receive an input voltage $V_{IN}$ from an energy source, such as a battery unit or an AC-DC adapter or other energy source. As exemplified by the above embodiments, the power IC 411 provides the output power signals for driving the RF modules of the RF unit 420. Since the power IC 411 can be controlled by setting the threshold voltage and/or current, power control can be performed dynamically and flexibly in view of the communication mode of the electronic device 400. The PMIC 415 is used for providing power signals for high-voltage electric loads, such as display unit, camera module, and is used for providing power signals for low-voltage electric loads, such as CPU. The electronic device 400 may also include other components, such as DDR memory and flash memory. In other embodiments, the power IC 411 and the PMIC 415 can be combined as a single chip or the power circuit unit 410 can be configured as a single unit within a chip.

Other embodiments of a system power circuit unit for use in an electronic device generally are provided as follows.

In one embodiment, the system power circuit unit includes a power circuit, in response to a plurality of control signals (such as two or more external control signals as exemplified above) including a first control signal, providing a plurality of output power signals including a first output power signal (e.g., $V_{OUT1}$) and a second output power signal ($V_{OUT2}$). The power circuit includes a plurality of power converters, such as two or more power converters exemplified in FIG. 1, 2 or 3, depending on the requirements for the electronic device, such as requirement for powering a radio frequency unit or a functional unit (such as electric loads as exemplified above) or both kinds of units. For example, the power circuit includes a first step-up converter, a first step-down converter, and a second step-down converter. The first step-up converter (such as 111 or 311), having an input terminal and an output terminal, is coupled to an input power signal (such as $V_{IN}$) via the input terminal of the first step-up converter. The first step-down converter has an input terminal and an output terminal, and the input terminal of the first step-down converter is coupled to the output terminal of the first step-up converter and the output terminal of the first step-down converter for providing the first output power signal. The second step-down converter has an input terminal and an output terminal, and the input terminal of the second step-down converter is coupled to the output terminal of the first step-up converter, wherein the input terminals of the first and the second step-down converters are to be coupled to the energy storage circuit. Each of the power converters of the power circuit, in response to the control signals, selectively operates in one of a plurality of modes including a normal mode and a bypass mode, wherein the normal mode enables the power converter correspondingly stepping up or stepping down an input signal of the power converter when the input signal thereof does not satisfy an associated threshold thereof; and the bypass mode enables the power converter to output the input signal thereof directly as its output signal when the input signal satisfies the associated threshold.

In another embodiment of the system power circuit unit, the power converters of the power circuit further includes a second step-up converter, having an input terminal and an output terminal, the input terminal of the second step-up converter for receiving the input power signal. This embodiment further provides an output power signal for use of any purpose.

In another embodiment of the system power circuit unit further includes: a power management circuit, coupled to the power circuit, having a plurality of input terminals and a plurality of output terminals, the power management circuit being coupled to the input power signal and the output terminal of the second step-up converter via a first one and a second one of the input terminals of the power management circuit, respectively. The power management circuit of this embodiment further utilizes the output power signal from the second step-up converter to provide appropriate voltage for powering of other power consuming electric load.

As exemplified in FIG. 3, one embodiment of the system power circuit unit can further includes: a control unit, coupled to the power converters, to control the power converters to operate in one of the modes including the normal mode and the bypass mode, selectively. This embodiment adopts an approach to control the power inverters by using a control unit, such as logic circuitry or microcontroller. The control unit can be a dedicated circuit embedded in the power circuit (in form of a power IC) or a processing unit such as a CPU of the system or a microcontroller external to the power circuit.

In one embodiment of the system power circuit unit, the power circuit further includes a communication interface (such as I2C, SPI, or so on), the power circuit is coupled to a second control signal of the control signals via the communication interface, wherein in response to the second control signal, the power circuit sets an associated threshold of the step-up converters and step-down converters Further embodiments of a portable electronic apparatus in general are provided as follows in associated with the system power circuit unit as exemplified above. In such embodiments, a portable electronic apparatus includes a device housing (such as a housing for a smart phone, a tablet computer, an electronic book or any data or media processing device), a display, a processing unit, providing a plurality of control signals for power control, a radio frequency unit, and a system power circuit unit. The apparatus can optionally include a holder configured to retain an energy source, such as a battery or any further power source package, for providing the input power signal exemplified above (such as $V_{IN}$). The energy source may have limited energy storage capacity, and when the energy source is going to be drained out, the voltage level provided by the energy source may decrease to a low level which can not satisfy an associated threshold, such as a minimum input voltage required for powering functions of the portable electronic apparatus. The system power circuit unit as exemplified above, may include: a power circuit and a power management circuit, coupled to the power circuit. The power circuit, in response to the control signals and an input power signal, provides a plurality of output power signals for powering the radio frequency unit, the power circuit comprising a plurality of power converters, and provides power signals for powering all or some or a specific one of components or units of the portable electronic apparatus, such as the display and the processing unit in response to the input power signal from the energy source.

According to an embodiment, a method for controlling a system power unit may include the following steps. In response to powering on the system, the CPU can apply control signal to power IC 411 to set threshold voltage and/or current limit, polarity of ADJ_BST1. Power IC 411 can apply power to input of high voltage regulators of PMIC 415 to drive camera module (optional), Flash memory, EMMC memory, or Display with backlight. Power IC 411 can also provide output power to drive RF unit 420 while communication is applied. The CPU, in response to a first communication mode, applies a first control signal to the power IC 411 to change an operation mode of the power converters of the power IC 411 so as to driving a first RF module. The CPU, in response to a second communication mode, applies a second control signal to the power IC 411 to change the threshold voltage and/or current limit of at least one of the power converters of the power IC 411 so as to driving a second RF module. In other embodiments, the method can be implemented according to the Table as discussed above.

In another embodiment, a method for powering in a portable electronic device, includes the following steps. A system power circuit unit is provided, wherein the system power circuit unit includes a power circuit, in response to a plurality of control signals and an input power signal, providing a plurality of output power signals for powering a radio frequency unit of the portable electronic device, the power circuit including a plurality of power converters. In response to a first control signal indicating a first communication mode for the portable electronic device, each of the power converters is selectively enabled in one of a plurality of modes including a normal mode and a bypass mode so as to power a first radio frequency module of the radio frequency unit. In response to the first control signal indicating a second communication mode for the portable electronic device, each of the power converters is selectively enabled in one of the modes so as to power a second radio frequency module of the radio frequency unit. The normal mode enables the power converter correspondingly stepping up or stepping down an input signal of the power converter when the input signal thereof does not satisfy an associated threshold thereof; and the bypass mode enables the power converter to output the input signal thereof directly as its output signal when the input signal satisfies the associated threshold.

Figure 5:
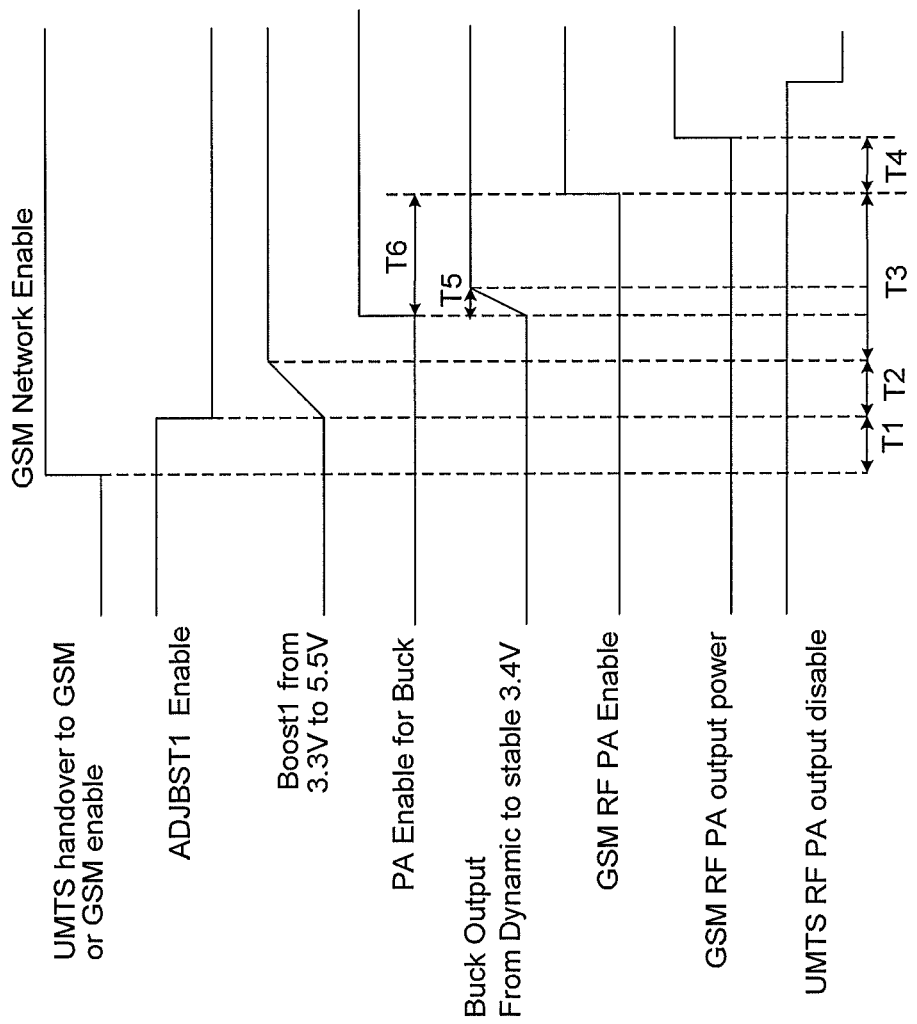
FIGS. 5 and 6 are timing diagrams indicating an embodiment of the sequence of operation of components of an electronic device using a system power architecture according to FIG. 4 for communication systems.

In a practical embodiment, an electronic device, such as a smart phone, a tablet computer, or any mobile device, supports different communication modes, such as 2G and 3G mode, using a power IC according to the system power architecture as shown in FIG. 4. FIG. 5 is a timing diagram indicating the sequence of operation of components of the electronic device using the power IC according to FIG. 4 in a 2 G communication mode. As shown in FIG. 5, an enable signal firstly is asserted when the 2 G communication mode (such as a GSM mode) is enabled or a handover is from a 3G mode (such as UMTS) to the GSM mode. After a time interval T1, ADJ_BST1 is enabled (or asserted) for changing the level of the output power signal $V_{BOUT1}$ of Boost1. After a time interval T2, Boost1 of the power IC 411 outputs an output power signal $V_{BOUT1}$ of 5.5V (stepping up from 3.3V), for example. An enable signal for a buck (e.g. EN_BK1) is enabled a period time of T6 before end of T3 to trigger the output of a buck. As illustrated in FIG. 5, the buck outputs from dynamic to an output level, e.g., 3.4V, within a time interval of T5, in response to the enable signal for the buck. After a time interval T3, an RF PA (such as PA for GSM high band or low band) of the RF unit 420 is enabled. After a time interval T4, the GSM RF PA outputs an output power as required by the requirement for the GSM mode. Afterwards, a RF PA for UMTS can be disabled. The total time of T1, T2, T3, and T4 is less than 1.3 s, wherein T2+T3, as required by the GSM standard, should be less than 12 ms. In addition, T1 is set up according to a platform operator while T4 is less than 40 us, for example.

Figure 6:
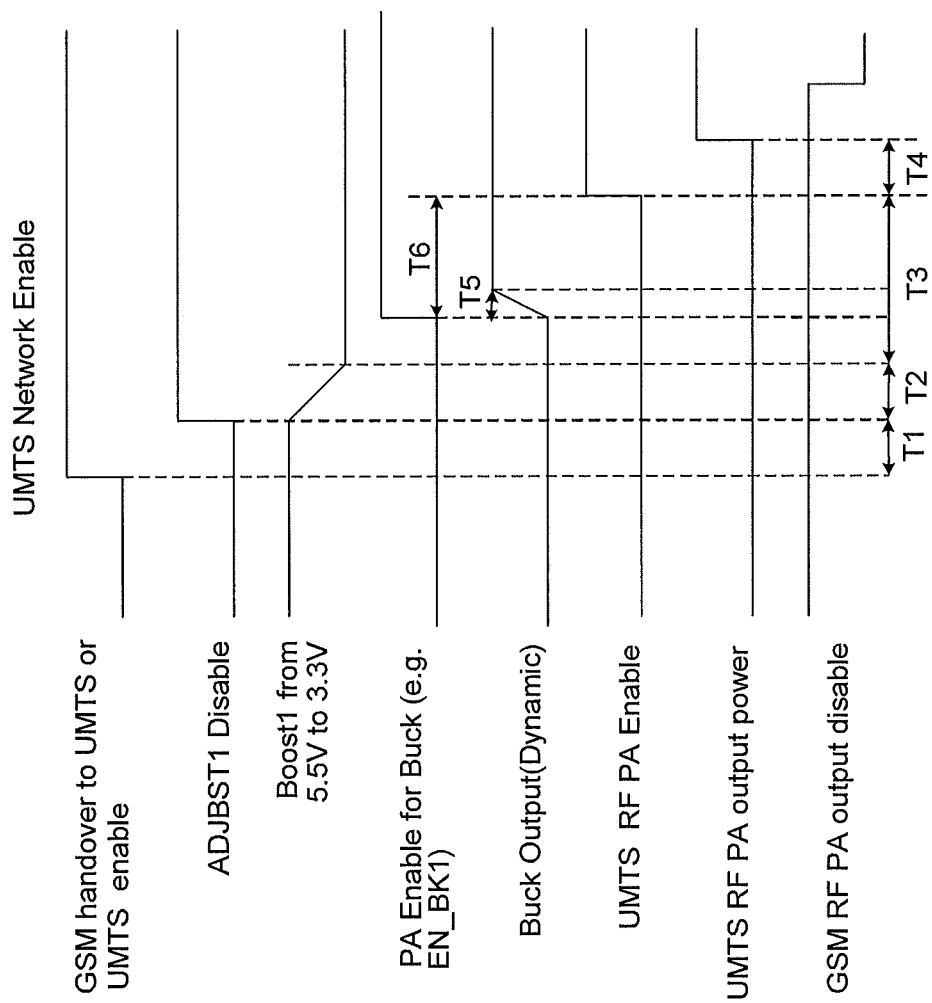

FIG. 6 is a timing diagram indicating the sequence of operation of components of the mobile device using a power IC according to FIG. 4 in a 3G communication mode. As shown in FIG. 6, an enable signal firstly is asserted when the 3G communication mode (such as a UMTS mode) is enabled or a handover is from a 2G mode (such as a GSM mode) to the UMTS mode. After a time interval T1, an enable signal ADJBST1 is disabled. In response, Boost1 changes its output level, e.g., from 5.5V to 3.3V, for a time interval T2. After a time interval T3, the RF PA for 3G (such as UMTS) is enabled. During the time period of T3, an enable signal for a buck (e.g., EN_BK1) is enabled a time interval T6 before the end of the time period of T3 and the buck outputs from dynamic to an output level for a time interval T5. After a time interval T4, the RF PA for UMTS outputs output power as required. Afterwards, the output of the RF PA for 2G (such as GSM) is disabled. The total time of T1, T2 is about 1.3 s, and T1 is less than 1 ms For example.

FIG. 7 illustrates a state table for a power IC according to an embodiment. In this embodiment, the power IC includes four power converters, as embodied by FIG. 1, 3, or 4. The power IC can be employed to provide output power signals for driving RF components for different communication modes, such as 2G (such as GSM, CDMA), 3G, or 4G (such as LTE, or so on) mode. In FIG. 7, column "Category" indicates different applications of the power converters for different operation modes and the other columns indicate corresponding conditions or states for those operation modes. In particular, OUTSU1 and OUTSU2 stands for enabling a first step-up (SU) converter (SU1), such as Boost1 or Bypass/Boost1, as shown in FIG. 1 or 3, and a second step-up converter (SU2), such as Boost2 or Bypass/Boost2, as shown in FIG. 1 or 3, while PAEN1 and PAEN2 stands for enabling a first step-down (SD) converter (SD1), such as Buck1 or Bypass/Buck1, as shown in FIG. 1 or 3, and a second step-down converter (SD2), such as Buck2 or Bypass/Buck2, as shown in FIG. 1 or 3. SYSEN indicates an enable signal for enabling the power IC, where H indicates enabling while L indicates disabling. Battery state has a HV state, i.e., the battery voltage or input voltage of SU1 or SU2, denoted by VBAT, is greater than a threshold, and a LV state, i.e., VBAT<=threshold. In FIG. 7, columns "SU1," "SD1," "SD2," and "SU2" represent the levels of the output signals of the power converters, respectively. In addition, the conditions in parentheses in column "SU1" or "SD2" indicate the criteria for those output levels. For example, for 2G mode in column "Category" with HV (VBAT>Vth of SU1) in column "Battery State," e.g. SU1 is in bypass mode, ADJBST1=L, PAEN1=H, and PAEN2=L, if "V_insd1>V_outsd1" is satisfied, i.e., it is determined that the input signal of SD1 is greater than a maximum output level of SD1, SD1 is in a buck mode with SD1=V_outsd1, i.e., SD1 outputs the output voltage of V_outsd1. Following this example, if "V_insd1<V_outsd1" is satisfied, then SD1 is in a bypass mode with SD1=V_insd1, i.e., SD1 outputs the input voltage of V_insd1.

In FIG. 7, when it is in a GSM mode (2G), SD1 will not enable APT (auto power tracking) mode and SD1 will be in the bypass mode or outputs V_outsd1. When it is in a UMTS or LTE mode (3G or 4G), SD1 or SD2 will enable APT mode/ET mode and the output voltage level of SD1 or SD2 is controlled by APT or ET (e.g., by way of digital signal or analog signal such as PWM signal or triangular signal). In other examples, V_outsu1 is a maximum output level of SU1, which can be set by control signals (such as by way of I2C programming). For the sake of brevity, one of ordinary skill in the art can derive the other operations from FIG. 7.

Figure 8A:
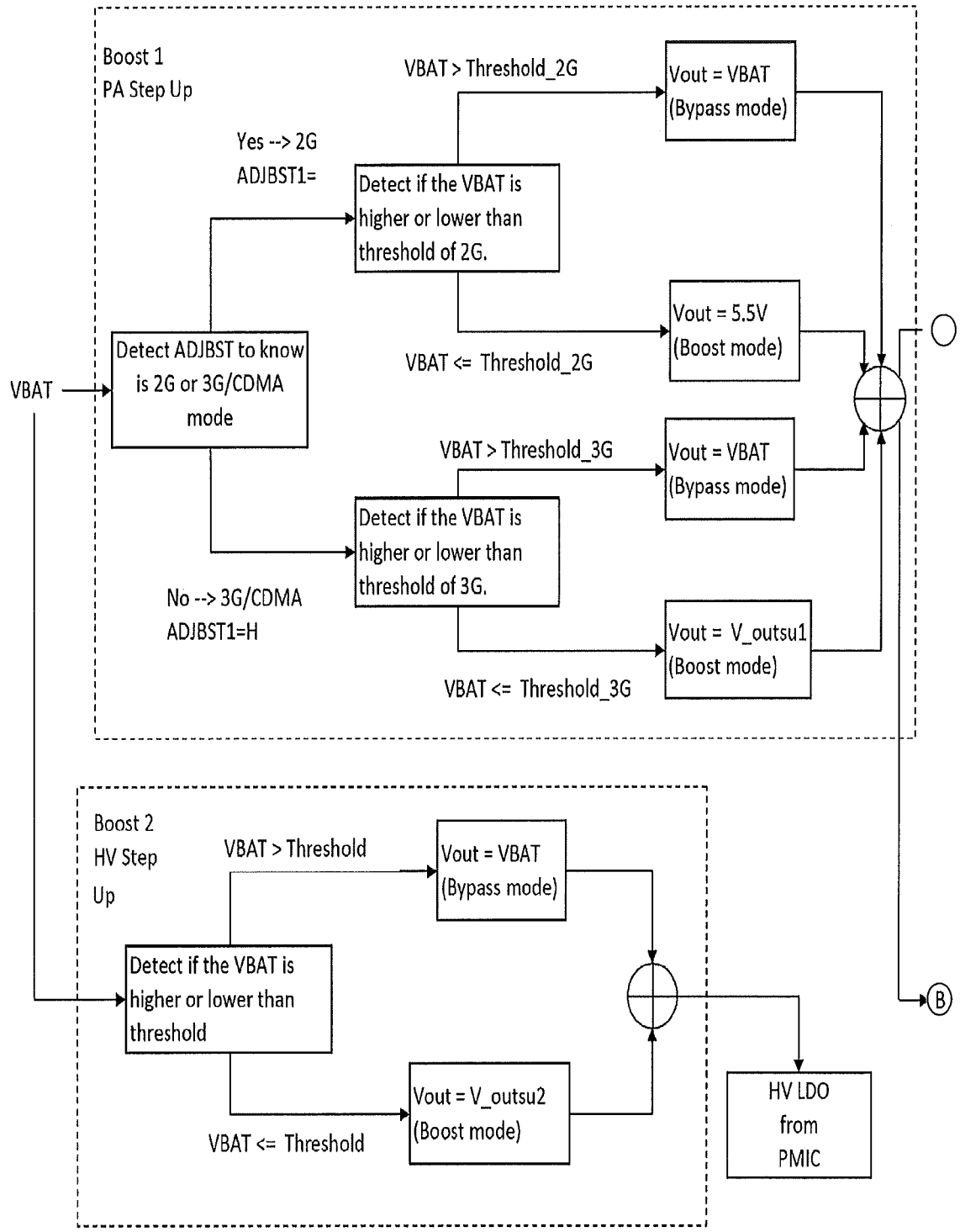
FIGS. 8A-8B illustrate a corresponding block diagram corresponding to a state diagram for the power IC according to the embodiment of FIG. 7.
Figure 8B:
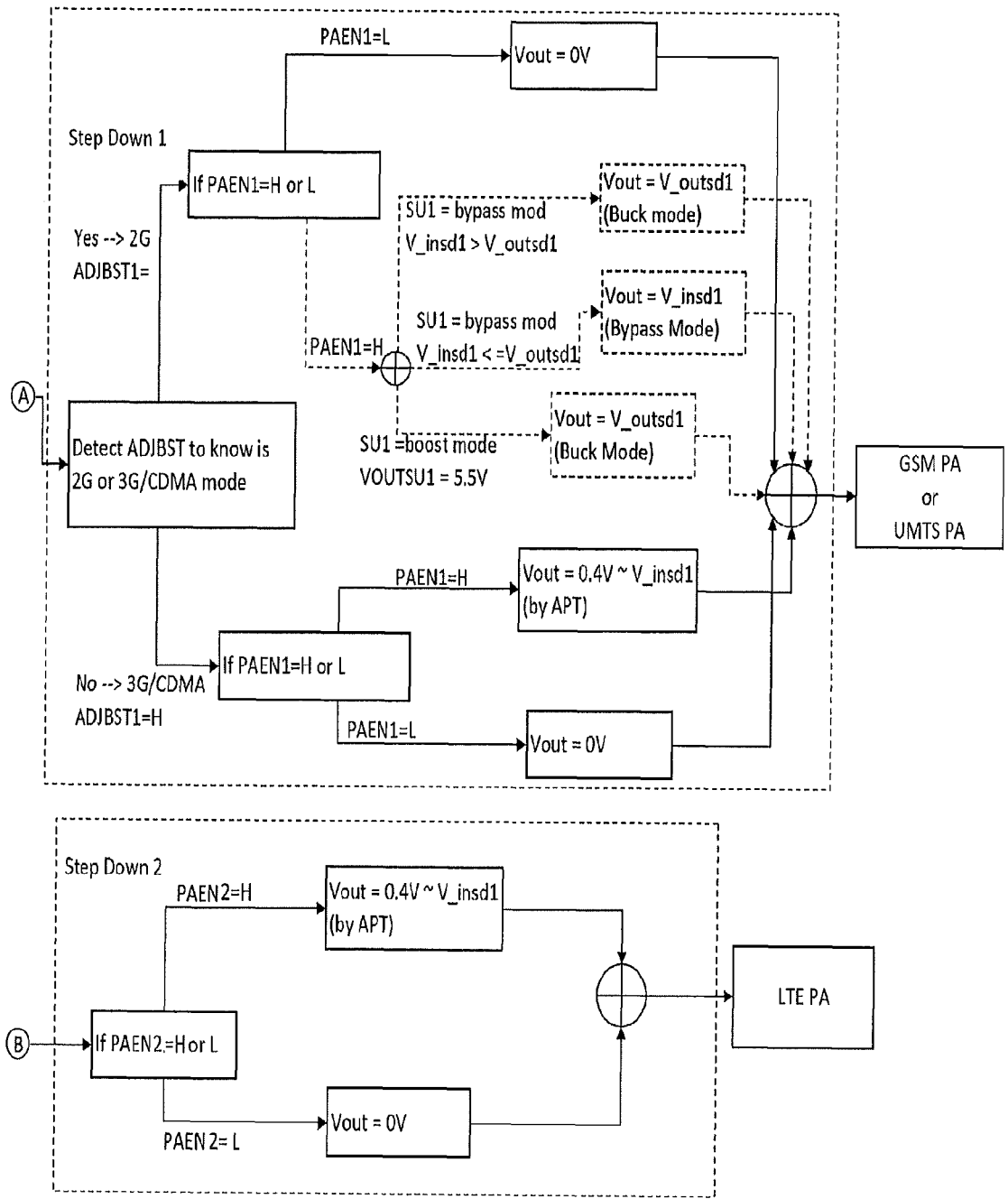

FIGS. 8A-8B illustrate a corresponding block diagram corresponding to a state diagram for the power IC according to the embodiment of FIG. 7. In FIGS. 8A and 8B, dashed blocks represent the processes (conditions or states (results)) relating to the step-up or step-down converters of a power IC, respectively. For example, a process, indicated by the dashed block on the upper left side, corresponds to the state diagram for the operation of SU1. First, a first control signal (such as ADJ_BST) is detected so as to determine whether a communication mode is enabled. If a first mode (such as a 2G mode) is enabled, it is determined whether an input signal (such as VBAT) satisfies a first condition (such as VBAT>threshold of 2G). If so, a bypass mode is entered and the output signal is substantially the same as the input signal. Otherwise, a boost mode is entered and the output signal is a first value (such as 5.5V). If a second mode (such as a 3G or a CDMA mode) is enabled, it is determined whether an input signal (such as VBAT) satisfies a second condition (such as VBAT>threshold of 3G). If so, a bypass mode is entered and the output signal is substantially the same as the input signal. Otherwise, a boost mode is entered and the output signal is a second value (such as V_outsu1).

A corresponding process can be also derived from FIGS. 7 and 8A-8B for SD1, SD2, or SU2. FIGS. 8A-8B thus also provide the embodiments of a method for providing power signals by way of step-up and step-down power conversions.

As such, the various embodiments of the above show the flexibility of system design according to the system power integrated circuit and architecture. The system power circuit unit or the power integrated circuit can be designed or configured to meet various requirements for powering for different purposes. In addition, in some embodiments, when the power status of the energy source is under a threshold for operation of one of the components or units, the power circuit performs the step-up conversion of the energy source to provide boosted voltage which is greater than the threshold to prolong the use of time of the energy source. In this way, user experience is enhanced since the battery time for the apparatus can be prolonged.

The implementation of the system power integrated circuit and architecture are not limited to the above embodiments. The following will present further scenarios or embodiments, such as those in form of a management circuit, a power supply arrangement, or a portable apparatus. For the sake of brevity, the scenarios or embodiments can be supported by way of combinations or modifications of elements exemplified in the embodiments and drawings above as well as equivalents.

Embodiments for a management circuit are provided as follows.

In one embodiment, a management circuit for a portable device includes an input terminal, a first step-up converter, a first step-down converter, and a second step-down converter. The input terminal is coupled to receive a supply voltage from a power supply. The first step-up converter, coupled to the input terminal, selectively converts the supply voltage to a boosted voltage. The first step-down converter, coupled to the first step-up converter, selectively provides a first output power voltage to a first radio frequency (RF) module (such as a module for 2G, 3G, or 4G). The second step-down converter, coupled to the first step-up converter, selectively provides a second output power voltage to a second radio frequency (RF) module (such as a module for 2G, 3G, or 4G). The first step-up converter performs the conversion of the supply voltage when the supply voltage is under a threshold voltage.

In another embodiment of the above management circuit, the first step down converter further includes a storage capacitor and the storage capacitor is pre-charged by the first step-up converter to provide a current for the first step-down converter. In addition, the boosted voltage is higher or closed to the corresponding threshold voltage. In another embodiment, the management circuit can further include a processing unit, wherein the processing unit determines the threshold voltage based on operation status of the first and second RF modules.

Further, the threshold voltage is a minimum operation voltage for operating one of the first and second RF modules. In some examples, power saving can be implemented in the management circuit in response to the operation of the module to be powered. For example, the first step-down converter is turned off when the first RF module is not used. In another example, the second step-down converter is turned off when the second RF module is not used.

Embodiments for a power supply arrangement are provided as follows.

In a first embodiment of the arrangement, a power supply arrangement for a portable device includes a first input terminal, a first step-up converter, a second step-up converter, a radio frequency unit, and a functional unit. The first input terminal is coupled to receive a supply voltage of an energy source. The first step-up converter, coupled to the first input terminal, selectively converts the supply voltage to a first boosted voltage. The second step-up converter, coupled to the first input terminal, selectively converts the supply voltage to a second boosted voltage. The radio frequency unit (such as a communication module for 2G, 3G, or 4G and so on) has a first operation voltage, coupled to the first step-up converter. The functional unit (such as system logic, one or more system components, modules, or sub-units, or any circuitry for performing one or more functions), having a second operation voltage, is coupled to the second step-up converter. The first step-up converter performs the conversion of the supply voltage when the supply voltage is lower than the first operation voltage, and the second step-up converter performs the conversion of the supply voltage when the supply voltage is lower than the second operation voltage.

The above power supply arrangement can further include a processing unit, coupled to the radio frequency unit and the functional unit. In this example, the processing unit can be configured to: detect the supply voltage; instruct the first step-up converter to perform the conversion of the supply voltage into the first boosted voltage when the supply voltage is lower than the first operation voltage; and instruct the second step-up converter to perform the conversion of the supply voltage into the second boosted voltage when the supply voltage is lower than the second operation voltage. In another embodiment, the power supply arrangement can further include a step-down converter, coupled to the first step-up converter, for selectively providing an output voltage to the radio frequency unit as the first operation voltage.

The first embodiment of the power supply arrangement can further include a power management circuit, which has a third input terminal coupled to the second step-up converter and a high voltage output terminal coupled to the functional unit. The power management circuit, coupled to the second step-up converter, selectively provides a high output voltage to the functional unit as the second operation voltage.

In one practical example, the functional unit includes: a high voltage electric load (such as an LCD panel with backlight, camera module, USB module, flash memory, or EMMC memory) with the second operation voltage and a low voltage electric load (such as CPU, SDRAM, DDR memory, control logic, I/O, and other devices) with a third operation voltage. In addition, the power supply arrangement can further include a power management circuit (such as one as an integrated circuit or a portion of circuitry), which has a third input terminal coupled to the second step-up converter and a high voltage output terminal coupled to the high voltage electric load. The power management circuit, according to the second boosted voltage from the second step-up converter, selectively provides a high output voltage to the high voltage electric load as the second operation voltage. In another implementation of the first embodiment of the power supply arrangement, the power management circuit can further include a second input terminal coupled to the energy source and a low voltage output terminal coupled to the low voltage electric load. The power management circuit, according to the energy source, selectively provides a low output voltage to the low voltage electric load as the third operation voltage. These examples show the flexibility in system design for powering the functional unit with different electric loads and the application of the boosted voltage from the power integrated circuit.

In a second embodiment of the power supply arrangement, a power integrated circuit and a power management circuit are connected and the power integrated circuit facilitates the operation of a high voltage electric load through the power management circuit even if the supply voltage is lower than the operation voltage of that load. The power supply arrangement includes: a power integrated circuit, a radio frequency unit, a functional unit, and a power management circuit. The power integrated circuit, with a first input terminal coupled to an energy source, a first output terminal, and a second output terminal, selectively converts a supply voltage of the energy source to a first boosted voltage and selectively converts the supply voltage to a second boosted voltage. The radio frequency unit with a first operation voltage, coupled to the first output terminal, receives the first boosted voltage. The functional unit includes a high voltage electric load with a second operation voltage; and a low voltage electric load with a third operation voltage. The power management circuit includes a second input terminal coupled to the energy source; a third input terminal coupled to the second output terminal of the power integrated circuit to receive the second boosted voltage; a third output terminal coupled to the high voltage electric load; and a fourth output terminal coupled to the low voltage electric load. The power integrated circuit performs the conversion of the supply voltage when the supply voltage is lower than the second operation voltage, and the power management circuit provide a low output voltage from the energy source to the low voltage electric load as the third operation voltage through the fourth output terminal.

In an example, the power management circuit includes a high voltage low-dropout (LDO) regulator and a low voltage low-dropout (LDO) regulator. The high voltage LDO regulator, with a first terminal coupled to the second output terminal and a second terminal coupled to the third output terminal, regulates the second boosted voltage to provide a high output voltage as the second operation voltage. The low voltage LDO regulator, with a first terminal coupled to the second input terminal and a second terminal coupled to the fourth output terminal, regulates the supply voltage to provide the low output voltage as the third operation voltage.

Embodiments for a portable apparatus are provided as follows.

A first embodiment of a portable apparatus includes a housing, a power integrated circuit, a radio frequency unit, and a functional unit. The power integrated circuit, retained in the housing, includes a first input terminal, a first boost converter, and a second boost converter. The first input terminal is coupled to an energy source providing a supply voltage. The first boost converter, with a first terminal coupled to the first input terminal and a second terminal, selectively converts the supply voltage to a first boosted voltage through the second terminal of the first boost converter. The second boost converter, with a first terminal coupled to the first input terminal and a second terminal, selectively converts the supply voltage to a second boosted voltage through the second terminal of the second boost converter. The radio frequency unit, with a first operation voltage, is retained in the housing and coupled to the first boost converter. The functional unit, with a second operation voltage, is retained in the housing and coupled to the second boost converter. The first boost converter performs the conversion of the supply voltage when the supply voltage is lower than the first operation voltage, and the second boost converter performs the conversion of the supply voltage when the supply voltage is lower than the second operation voltage.

The above portable apparatus can further include a processing unit, coupled to the radio frequency unit and the functional unit. The processing unit can be configured to: detect the supply voltage; instruct the first boost converter to perform the conversion of the supply voltage into the first boosted voltage when the supply voltage is lower than the first operation voltage; and instruct the second boost converter to perform the conversion of the supply voltage into the second boosted voltage when the supply voltage is lower than the second operation voltage.

The first embodiment of the portable apparatus can further include a power management circuit, which has an input terminal coupled to the second terminal of the second boost converter and a high voltage output terminal coupled to the functional unit. The power management circuit selectively provides a high output voltage from the second boost converter to the functional unit as the second operation voltage.

A second embodiment of the portable apparatus includes a housing, a power integrated circuit, a radio frequency unit, and a functional unit. The power integrated circuit, retained in the housing, includes a first input terminal, a first boost converter, and a second boost converter. The first input terminal is coupled to an energy source providing a supply voltage. The first boost converter, with a first terminal coupled to the first input terminal and a second terminal, selectively boosts the supply voltage to an output voltage through the second terminal of the first boost converter. The second boost converter, with a first terminal coupled to the first input terminal and a second terminal, selectively boosts the supply voltage to a high output voltage through the second terminal of the second boost converter. The radio frequency unit, with a first operation voltage, is retained in the housing and coupled to the second terminal of the first boost converter. The functional unit, retained in the housing and coupled to the second terminal of the second boost converter, includes a high voltage electric load with a second operation voltage and a low voltage electric load with a third operation voltage. The first boost converter performs the conversion of the supply voltage when the supply voltage is lower than the first operation voltage, and the second boost converter performs the conversion of the supply voltage when the supply voltage is lower than the second operation voltage.

The second embodiment of the portable apparatus can further include a processing unit, coupled to the radio frequency unit and the functional unit. The processing unit can be configured to: detect the supply voltage; instruct the first boost converter to perform the conversion of the supply voltage into the output voltage of the first boost converter when the supply voltage is lower than the first operation voltage; and instruct the second boost converter to perform the conversion of the supply voltage into the high output voltage when the supply voltage is lower than the second operation voltage.

In the second embodiment of the portable apparatus, the power integrated circuit can further be configured to provide the output voltage of the first boost converter to the radio frequency unit as the first operation voltage.

The second embodiment of the portable apparatus can further include a power management circuit, which is retained in the housing and has a third input terminal coupled to the second boost converter and a high voltage output terminal coupled to the high voltage electric load. The power management circuit selectively provides the high output voltage from the second boost converter to the high voltage electric load as the second operation voltage. In an example, the power management circuit can further include a second input terminal coupled to the energy source and a low voltage output terminal coupled to the low voltage electric load, and selectively provides a low output voltage from the energy source to the low voltage electric load as the third operation voltage.

A third embodiment of the portable apparatus includes a housing, a power integrated circuit, a radio frequency unit, a functional unit, and a power management circuit. The power integrated circuit is retained in the housing, with a first input terminal coupled to an energy source, a first output terminal, and a second output terminal. The power integrated circuit selectively converts a supply voltage of the energy source to a first boosted voltage and for selectively converting the supply voltage to a second boosted voltage. The radio frequency unit, with a first operation voltage, is retained in the housing and coupled to the first output terminal to receive the first boosted voltage. The functional unit includes: a high voltage electric load with a second operation voltage; and a low voltage electric load with a third operation voltage. The power management circuit, retained in the housing, includes: a second input terminal coupled to the energy source; a third input terminal coupled to the second output terminal of the power integrated circuit to receive the second boosted voltage; a third output terminal coupled to the high voltage electric load; and a fourth output terminal coupled to the low voltage electric load. The power integrated circuit performs the conversion of the supply voltage when the supply voltage is lower than the second operation voltage, and the power management circuit provides a low output voltage from the energy source to the low voltage electric load as the third operation voltage through the fourth output terminal.

In the third embodiment of the portable apparatus, the power management circuit can further include: a high voltage low-dropout regulator and a low voltage low-dropout regulator. The high voltage low-dropout regulator, with a first terminal coupled to the second output terminal of the power integrated circuit and a second terminal coupled to the fourth output terminal, regulates the second boosted voltage to provide a high output voltage as the second operation voltage. The low voltage low-dropout regulator, with a first terminal coupled to the second input terminal and a second terminal coupled to the fourth output terminal, regulates the supply voltage to provide the low output voltage as the third operation voltage.

The above embodiments disclose a system power integrated circuit and system power architecture for portable devices and a method for controlling the same, and a method for providing power signals. Power control can be performed dynamically and flexibly in view of the status of the energy source, e.g., the energy source in a state of lower or higher output signal level, or in view of the operating mode of the electronic device, or in view of power resource control. In one embodiment, the energy source in a low power state can still provide appropriate power signals for driving the RF module by way of the power converters and the energy storage circuit.

While the disclosure has been described by way of example and in terms of the exemplary embodiment(s), it is to be understood that the disclosure is not limited thereto. On the contrary, it is intended to cover various modifications and similar arrangements and procedures, and the scope of the embodiments therefore should be accorded the broadest interpretation so as to encompass all such modifications and similar arrangements and procedures.

What is claimed is:

1. A management circuit for a portable device, comprising:
an input terminal coupled to receive a supply voltage from an energy source;
a first step-up converter, coupled to the input terminal, for selectively converting the supply voltage to a first boosted voltage;
a second step-up converter, coupled to the input terminal, for selectively converting the supply voltage to a second boosted voltage;
a first step-down converter, coupled to the first step-up converter, for selectively providing a first output power voltage to a first radio frequency (RF) module;
a second step-down converter, coupled to the first step-up converter, for selectively providing a second output power voltage to a second radio frequency (RF) module;
wherein the first step-up converter performs the conversion of the supply voltage when the supply voltage is under a threshold voltage;
a high voltage electric load with a first operation voltage;
a low voltage electric load with a second operation voltage;
a high voltage low dropout regulator, coupled to the second step-up converter and the high voltage electric load, for regulating the second boosted voltage to provide a high output voltage as the first operation voltage of the high voltage electric load; and
a low voltage low dropout regulator connected to the energy source without any intervening components, for regulating the supply voltage to provide a low output voltage as the second operation voltage.

2. The management circuit according to claim 1, wherein the first step down converter further comprises a storage capacitor, the storage capacitor is pre-charged by the first step-up converter to provide a current for the first step-down converter.

3. The management circuit according to claim 1, wherein the boosted voltage is higher or close to the threshold voltage.

4. The management circuit according to claim 1, further comprising a processing unit, wherein the processing unit determines the threshold voltage based on operation status of the first and second RF modules.

5. The management circuit according to claim 1, wherein the threshold voltage is a minimum operation voltage for operating one of the first and second RF modules.

6. The management circuit according to claim 1, wherein the first step-down converter is turned off when the first RF module is not used.

7. The management circuit according to claim 1, wherein the second step-down converter is turned off when the second RF module is not used.

8. A power supply arrangement for a portable device, comprising:
a first input terminal coupled to receive a supply voltage of an energy source;
a first step-up converter, coupled to the first input terminal, for selectively converting the supply voltage to a first boosted voltage;
a second step-up converter, coupled to the first input terminal, for selectively converting the supply voltage to a second boosted voltage;
a radio frequency unit with a first operation voltage;
a step-down converter coupled to the first step-up converter for selectively providing an output voltage to the radio frequency unit as the first operation voltage;
a functional unit, including a high voltage electric load having a second operation voltage and a low voltage electric load having a third operation voltage;
wherein the first step-up converter performs the conversion of the supply voltage when the supply voltage is lower than the first operation voltage, and the second step-up converter performs the conversion of the supply voltage when the supply voltage is lower than the second operation voltage; and
a power management circuit including a high voltage low dropout regulator, the high voltage low dropout regulator being coupled to the second step-up converter and the high voltage electric load for regulating the second boosted voltage to provide a high output voltage as the second operation voltage; and
a low voltage low dropout regulator, connected to the energy source without any intervening components, for regulating the supply voltage to provide a low output voltage as the third operation voltage.

9. The power supply arrangement according to claim 8, further comprising a processing unit, coupled to the radio frequency unit and the functional unit, configured to:
detect the supply voltage;
instruct the first step-up converter to perform the conversion of the supply voltage into the first boosted voltage when the supply voltage is lower than the first operation voltage; and
instruct the second step-up converter to perform the conversion of the supply voltage into the second boosted voltage when the supply voltage is lower than the second operation voltage.

10. The power supply arrangement according to claim 8, wherein the power management circuit has a third input terminal coupled to the second step-up converter and a high voltage output terminal coupled to the high voltage electric load, the power management circuit, according to the second boosted voltage from the second step-up converter, for selectively providing the high output voltage to the high voltage electric load as the second operation voltage.

11. A power supply arrangement comprising:
a power integrated circuit, with a first input terminal coupled to an energy source, a first output terminal, and a second output terminal, for selectively converting a supply voltage of the energy source to a first boosted voltage and for selectively converting the supply voltage to a second boosted voltage;
a radio frequency unit with a first operation voltage;
a step-down converter coupled to the first output terminal, for selectively providing an output voltage to the radio frequency unit as the first operation voltage.
a functional unit, comprising:
a high voltage electric load with a second operation voltage; and
a low voltage electric load with a third operation voltage;
a power management circuit, comprising:
a second input terminal coupled to the energy source;
a third input terminal coupled to the second output terminal of the power integrated circuit to receive the second boosted voltage;
a third output terminal coupled to the high voltage electric load;
a fourth output terminal coupled to the low voltage electric load;

wherein the power integrated circuit performs the conversion of the supply voltage when the supply voltage is lower than the second operation voltage;

wherein the power management circuit further comprises a high voltage low dropout regulator, with a first terminal coupled to the second output terminal and a second terminal coupled to the third output terminal, for regulating the second boosted voltage to provide a high output voltage as the second operation voltage; and a low voltage low dropout regulator, connected to the energy source without any intervening components, with a first terminal coupled to the second input terminal and a second terminal coupled to the fourth output terminal, for regulating the supply voltage to provide a low output voltage as the third operation voltage.

12. A portable apparatus comprising:
a housing;
a power integrated circuit, retained in the housing, comprising:
  a first input terminal coupled to an energy source providing a supply voltage;
  a first boost converter, with a first terminal coupled to the first input terminal and a second terminal, for selectively converting the supply voltage to a first boosted voltage through the second terminal of the first boost converter;
  a second boost converter, with a first terminal coupled to the first input terminal and a second terminal, for selectively converting the supply voltage to a second boosted voltage through the second terminal of the second boost converter;
a radio frequency unit with a first operation voltage, retained in the housing;
a step-down converter, coupled to the second terminal of the first boost converter, for selectively providing an output voltage to the radio frequency unit as the first operation voltage;
a functional unit including a high voltage electric with a second operation voltage, retained in the housing and coupled to the second boost converter and a low voltage electric load with a third operation voltage;
wherein the first boost converter performs the conversion of the supply voltage when the supply voltage is lower than the first operation voltage, and the second boost converter performs the conversion of the supply voltage when the supply voltage is lower than the second operation voltage; and
a power management circuit including a high voltage low dropout regulator, the high voltage low dropout regulator being coupled to the second boost converter and the high voltage electric load for regulating the second boosted voltage to provide a high output voltage as the second operation voltage, and
a low voltage low dropout regulator, connected to the energy source without any intervening components, for regulating the supply voltage to provide a low output voltage as the third operation voltage.

13. The portable apparatus according to claim 12, further comprising a processing unit, coupled to the radio frequency unit and the functional unit, configured to:
detect the supply voltage;
instruct the first boost converter to perform the conversion of the supply voltage into the first boosted voltage when the supply voltage is lower than the first operation voltage; and
instruct the second boost converter to perform the conversion of the supply voltage into the second boosted voltage when the supply voltage is lower than the second operation voltage.

14. The portable apparatus according to claim 12, wherein the power management circuit has an input terminal coupled to the second terminal of the second boost converter and a high voltage output terminal coupled to the high voltage electric load, for selectively providing a high output voltage from the second boost converter to the high electric load as the second operation voltage.

15. A portable apparatus comprising:
a housing;
a power integrated circuit, retained in the housing, comprising:
  a first input terminal coupled to an energy source providing a supply voltage;
  a first boost converter, with a first terminal coupled to the first input terminal and a second terminal, for selectively boosting the supply voltage to an output voltage through the second terminal of the first boost converter;
  a second boost converter, with a first terminal coupled to the first input terminal and a second terminal, for selectively boosting the supply voltage to a high output voltage through the second terminal of the second boost converter;
a radio frequency unit with a first operation voltage, retained in the housing;
a step-down converter, coupled to the second terminal of the first boost converter, for selectively providing an output voltage to the radio frequency unit as the first operation voltage;
a functional unit, retained in the housing and coupled to the second terminal of the second boost converter, comprising:
  a high voltage electric load with a second operation voltage; and
  a low voltage electric load with a third operation voltage;
wherein the first boost converter performs the conversion of the supply voltage when the supply voltage is lower than the first operation voltage, and the second boost converter performs the conversion of the supply voltage when the supply voltage is lower than the second operation voltage;
a power management circuit including a high voltage low dropout regulator, the high voltage low dropout regulator being coupled to the second boost converter and the high voltage electric load for regulating the boosted supply voltage to provide the high output voltage as the second operation voltage: and
a low voltage low dropout regulator, connected to the energy source without any intervening components, for regulating the supply voltage to provide a low output voltage as the third operation voltage.

16. The portable apparatus according to claim 15, further comprising a processing unit, coupled to the radio frequency unit and the functional unit, configured to:
detect the supply voltage;
instruct the first boost converter to perform the conversion of the supply voltage into the output voltage of the first boost converter when the supply voltage is lower than the first operation voltage; and
instruct the second boost converter to perform the conversion of the supply voltage into the high output voltage when the supply voltage is lower than the second operation voltage.

17. The portable apparatus according to claim 15, wherein the power integrated circuit is further configured to provide the output voltage of the first boost converter to the radio frequency unit as the first operation voltage.

18. The portable apparatus according to claim 15, wherein the power management circuit retained in the housing and has a third input terminal coupled to the second boost converter and a high voltage output terminal coupled to the high voltage electric load, for selectively providing the high output voltage from the second boost converter to the high voltage electric load as the second operation voltage.

19. A portable apparatus comprising:
  a housing;
  a power integrated circuit, retained in the housing, with a first input terminal coupled to an energy source, a first output terminal, and a second output terminal, for selectively converting a supply voltage of the energy source to a first boosted voltage and for selectively converting the supply voltage to a second boosted voltage;
  a radio frequency unit, retained in the housing, with a first operation voltage;
  a step-down converter, coupled to the first output terminal, for selectively providing an output voltage to the radio frequency unit as the first operation voltage;
  a functional unit, comprising:
    a high voltage electric load with a second operation voltage; and
    a low voltage electric load with a third operation voltage;
  a power management circuit, retained in the housing, comprising:
    a second input terminal coupled to the energy source;
    a third input terminal coupled to the second output terminal of the power integrated circuit to receive the second boosted voltage;
    a third output terminal coupled to the high voltage electric load;
    a fourth output terminal coupled to the low voltage electric load;
  wherein the power integrated circuit performs the conversion of the supply voltage when the supply voltage is lower than the second operation voltage;
  wherein the power management circuit further comprises a high voltage low dropout regulator, with a first terminal coupled to the second output terminal and a second terminal coupled to the third output terminal, for regulating the second boosted voltage to provide a high output voltage as the second operation voltage; and
  a low voltage low dropout regulator, connected to the energy source without any intervening components, with a first terminal coupled to the second input terminal and a second terminal coupled to the fourth output terminal, for regulating the supply voltage to provide a low output voltage as the third operation voltage.

20. A portable apparatus, comprising:
  a display;
  a processing unit, providing a plurality of control signals for power control;
  a radio frequency unit;
  a system power circuit unit, comprising:
    a power circuit, in response to the control signals and an input power signal, providing a plurality of output power signals for powering the radio frequency unit, the power circuit comprising a plurality of power converters; and
    a power management circuit, coupled a high voltage low dropout regulator and a low voltage low dropout regulator, coupled to the power circuit, providing power signals for powering the display and the processing unit in response to the input power signal, wherein the high voltage low dropout regulator is for regulating a supply voltage to provide a high output voltage as an operation voltage of the display in response to a first control signal indicating the supply voltage being converted into the high output voltage, and the low voltage low dropout regulator connected to an energy source without any intervening components is for regulating the supply voltage to provide a low output voltage as an operation voltage of a low voltage electric load in response to a second control signal indicating the supply voltage being converted into the low output voltage;
  wherein each of the power converters of the power circuit, in response to a third control signal, selectively operates in one of a plurality of modes including a normal mode and a bypass mode, wherein the normal mode enables the power converter correspondingly stepping up or stepping down an input signal of the power converter when the input signal thereof does not satisfy an associated threshold thereof; and the bypass mode enables the power converter to output the input signal thereof directly as its output signal when the input signal satisfies the associated threshold.

21. A method for powering in a portable electronic device, comprising:
  providing a system power circuit unit, wherein the system power circuit unit comprises a power circuit, in response to a plurality of control signals and an input power signal, providing a plurality of output power signals for powering a radio frequency unit, a low voltage electric load and a high voltage electric load of the portable electronic device, the power circuit comprising a plurality of power converters;
  in response to a first control signal indicating a first communication mode for the portable electronic device, selectively enabling each of the power converters in one of a plurality of modes including a normal mode and a bypass mode so as to power a first radio frequency module of the radio frequency unit;
  in response to the first control signal indicating a second communication mode for the portable electronic device, selectively enabling each of the power converters in one of the modes so as to power a second radio frequency module of the radio frequency unit;
  in response to a second control signal indicating a supply voltage being converted into a high output voltage, enabling a step-up converter of the power converters and a high voltage low dropout regulator for regulating the supply voltage to provide the high output voltage as an operation voltage of the high voltage electric load; and
  in response to a third control signal indicating the supply voltage being converted into a low output voltage, enabling a low voltage low dropout regulator connected to an energy source without any intervening components for regulating the supply voltage to provide the low output voltage as the operation voltage of the low voltage electric load;

wherein the normal mode enables the power converter correspondingly stepping up or stepping down an input signal of the power converter when the input signal thereof does not satisfy an associated threshold thereof; and the bypass mode enables the power converter to output the input signal thereof directly as its output signal when the input signal satisfies the associated threshold.

\* \* \* \* \*